Patented Oct. 6, 1936

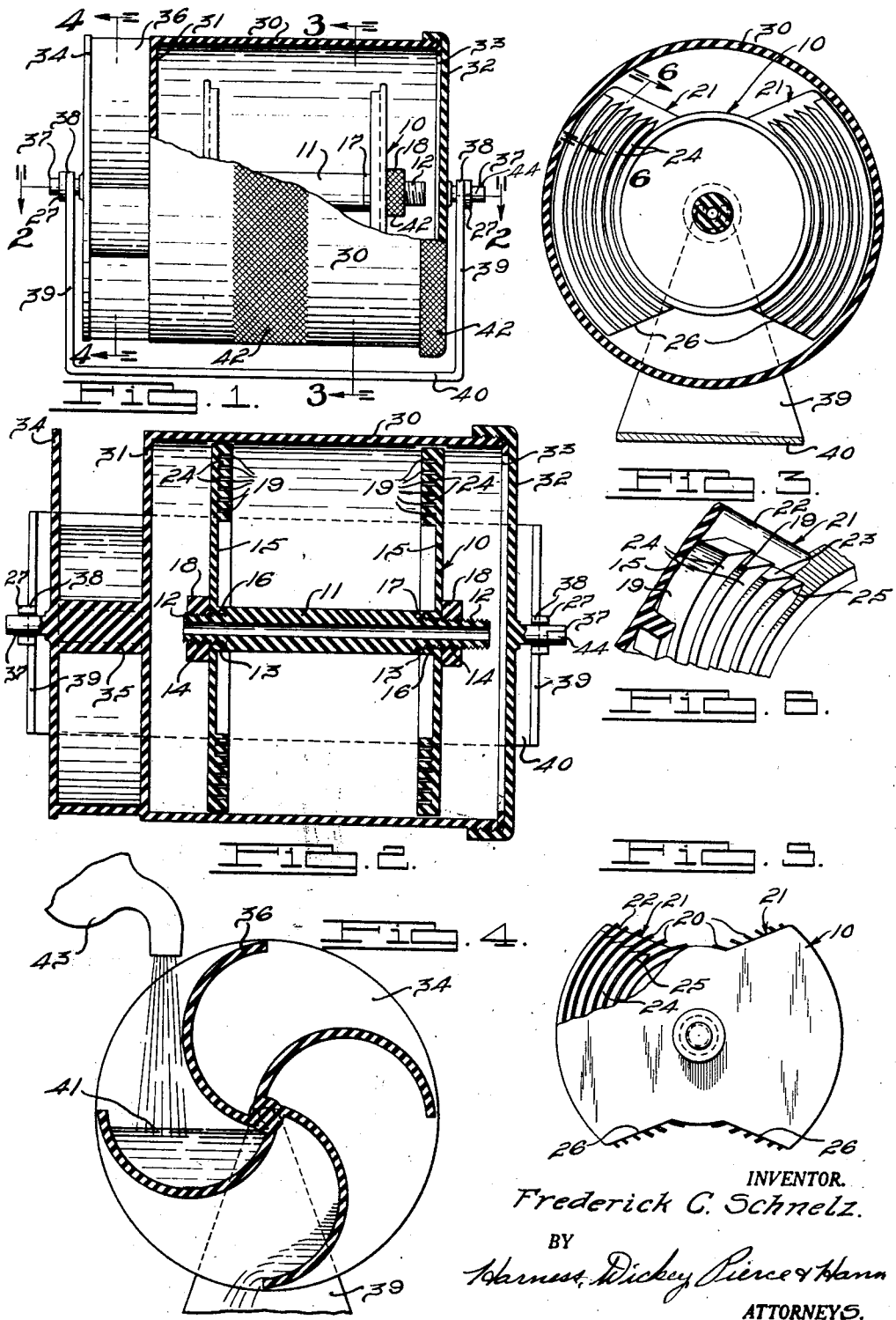

2,056,298

UNITED STATES PATENT OFFICE 2,056,298

DEVICE FOR DEVELOPING CUT FILMS AND FILM PACKS

Frederick C. Schnelz, Royal Oak, Mich.

Application March 14, 1935, Serial No. 10,965

9 Claims. (Cl. 95—100)

This invention relates to an improved apparatus for developing, fixing and/or washing photographic films, the principal object being to provide a means whereby a plurality of separate photographic films may be developed, fixed and/or washed effectively as a unit without necessitating manually handling them during the operation.

Another object of the invention is to provide a film developing, fixing and/or washing apparatus capable of being used efficiently in total darkness, if necessary, without danger of finger printing, scratching or otherwise injuring the films.

Another object of the invention is to provide a photographic film developing, fixing and/or washing apparatus which is capable of being readily adapted to receive different sizes of films.

Another object of the invention is to provide a means for supporting a plurality of separate photographic films in spaced relation whereby to enable them, as a unit, to be passed through developing, fixing and/or washing solutions.

Another object of the invention is to provide a holder for supporting a plurality of separate films in spaced relation and so constructed as to provide ready access to each film supported therein and to facilitate the insertion and withdrawal of the individual films to and from their respective positions without disturbing any other films supported thereby.

Another object of the invention is to provide an apparatus which will effectively develop, fix and/or wash photographic films with a minimum amount of liquid.

Another object is to provide a film developing apparatus which will give the films supported therein a curved shape to provide a rigidity to the films transverse to the curvature.

Another object of the invention is to provide an apparatus which will utilize falling water to rotate the photographic film developing, fixing and/or washing tank and thereby cause the developing, fixing and washing liquid in the tank to bathe the films supported therein.

Another object of the invention is to provide an apparatus for developing, fixing and/or washing photographic films which is simple in construction, efficient and effective in its use and inexpensive to manufacture.

The above being among the objects of the present invention, the same consists in certain novel features of construction, combinations and arrangement of parts to be hereinafter described with reference to the accompanying drawing, and then claimed, having the above and other objects in view.

In the accompanying drawing which shows a suitable embodiment of the present invention and in which like numerals refer to like parts throughout the several different views:—

Fig. 1 is a side elevational view of a photographic film developing, fixing and/or washing apparatus embodying the present invention, with the tank part thereof partly broken away to show the position of the film supporting means therein;

Fig. 2 is a slightly enlarged sectional view of the apparatus shown in Fig. 1, taken through the axis thereof as on the line 2—2 of Fig. 1;

Fig. 3 is a slightly enlarged, transverse sectional view of the apparatus shown in the preceding figures, taken on the line 3—3 of Fig. 1;

Fig. 4 is a slightly enlarged transverse sectional view of the embodiment shown in Fig. 1, taken through the water wheel portion thereof as on the line 4—4 of Fig. 1, an open and flowing water faucet being depicted in connection therewith to show a method of operating the same;

Fig. 5 is an end view of the film supporting means removed from the tank and partially cut away to show the construction and manner in which films are supported therein;

Fig. 6 is an enlarged, fragmentary, perspective view of an inner face of the film supporting means, showing the construction thereof at the area at which the films are inserted, as on line 6—6, Fig. 3.

Referring now to the drawings, a film supporting means or spool is indicated generally at 10. This spool is comprised of a central axle, post or spindle 11 having end portions 12 of a reduced diameter forming radial shoulders 13. The end portions 12 are threaded as indicated at 14 substantially throughout their length. Upon each of these reduced end portions 12 is received a plate like member 15 shown herein in the form of a disc. Each of the discs 15 is provided with a central hub portion 16 having a bore or opening therethrough just large enough to permit the disc to be slipped on the end portions 12 of the post 11, to and against the shoulders 13. In viewing the drawing and particularly Fig. 2, it will be noted that an annular spacing ring means 17, to be hereinafter described, may be interposed between the shoulder 13 upon the right end of post 11 and the inner portion of hub 16 of the disc 15 adjacent thereto. Due to the fit between the hub 16 of disc 15 upon end portions 12, and against shoulder 13, it is evident that the discs 15 are centrally maintained with respect to the post 11 and are supported in spaced and parallel relation relative to each other. Nuts 18 are provided to engage the threads 14 upon the end portions 12 and serve when tightened thereon to clamp the discs 15 against their corresponding shoulders 13 so as to frictionally lock the respective discs to the spindle 11 and thereby prevent the discs from rotating relative to the spindle or to each other. It will be noted, however, that where an annular spacer 17 is interposed between one of the shoulders 13 and the inner edges of hub 16 of one of the discs 15 the nut 18 upon that end of spindle 11 secures said disc 15 against the spacer 17 and the spacer against the shoulder to attain the frictionally locked relation mentioned.

The inwardly facing or opposed faces of the discs 15 and particularly that portion of the faces near the periphery of the disc, are provided with symmetrically opposed and oppositely matched grooves 19 therein, and, while these grooves may be of any desired shape and contour as long as they are spaced from one another they are preferably arranged in approximately parallel relation with respect to each other about the axis of the spindle 11. Thus, these grooves are provided and adapted to receive individual films 20 between them, as indicated in Fig. 5, the opposite edges of the films 20 being received in opposed grooves 19 upon the opposing faces of discs 15. Although the grooves 19 may be of any suitable configuration as long as they serve to guide and support films 20 therein in a spaced relation, ordinarily it will be found most convenient and economical from the standpoint of manufacture and use to form them concentrically to each other and to the axis of the spool and spindle 11, as shown.

The disposing of the film receiving grooves 19 in a concentric or otherwise longitudinally curved manner has other important advantages. When the films are inserted into the curved grooves they assume a correspondingly curved shape. This curved shape provides a rigidity in the films against a bending or a flexing transverse to the line of curvature and thereby insures in preventing the films from rubbing together or otherwise interfering with each other during the developing processes.

In order to permit the insertion of the films individually into the individual corresponding grooves 19, each circular disc 15 has marginal portions cut away to provide a notch or notches designated by the numeral 21. The number of such notches 21 will ordinarily depend upon the size of the films to which the spool is adapted to receive and the diameter of the spool itself. However, in the particular case illustrated, the spool is assumed to be of sufficient diameter to accommodate a pair of films in circular alignment without overlapping. Consequently, in the embodiment illustrated, it is necessary to provide only one notch 21 for access to the two films introduced in a single groove, one at each side of the notch. It is evident that this ready access to the individual films provided by the notch or notches 21 enables the insertion and withdrawal of individual films to and from parts of corresponding grooves without disturbing any of the films in the other grooves. The radial depth to which notches 21 are cut is that which is sufficient to expose the ends of all the grooves.

As indicated in Figs. 3 and 6, in order to facilitate the entrance of the individual films 20 into the individual grooves 19, the edges of the discs 15 along the margins of the notches 21 are cut away to the depth of the lands 24 formed between the grooves 19 so as to provide flanges 22 adjacent the outwardly opposed faces of said discs 15, between which flanges the edges of the films may be guided during the insertion of the same into the grooves 19. Additionally, the corresponding ends of the lands 24 formed between the grooves 19 are preferably bevelled off, as at 23, to provide widened mouths for the grooves and further facilitate the entrance of the edges of the films 20 into their corresponding grooves 19. It will be noted, as shown in Figs. 5 and 6, that where the lands 24 are bevelled only upon one side at their ends, one of the lands, such a land indicated at 25 adjacent the innermost groove 19, is preferably bevelled upon both sides to provide a wider opening or mouth to both of the adjacent grooves 19.

As indicated in Figs. 3 and 5, a second set of notches 26 is formed in the discs 20 in a diametrically opposed relation to the set of notches 21 upon each disc. It will be recognized that this second set of notches 26 may also be provided with flanges 22 and bevelled lands, as at 23, as are notches 21 to facilitate the insertion of films 20 through the notches 26, but although these notches 26 are not essential to permit the application of two different groups of films 20 to the spool, they will be found convenient for the purpose of preventing the spool from rolling while resting on a surface during a loading operation. In addition, it might also be noted that this second set of notches 26 also acts to equalize the distribution of weight about the axis of the spindle 11 so as to render the spool more easily rotatable during a developing, fixing and/or washing operation, in the manner hereinafter described.

Referring now to Fig. 2, and particularly to the annular spacer 17 between the right-hand disc 15 and the corresponding shoulder 13 of the spindle 11, this is provided for axially spacing the disc 15 an amount required to receive a certain size of films 20. Should it be desired to employ the spool 10 for a larger size of film, the nut 18 upon the end portion 12 of the spindle 11 adjacent the spacer 17 may be removed together with the right-hand disc 15, as viewed in Fig. 2, and the spacer 17 may be replaced by a longer spacer, or an additional spacer may be added so that, upon re-assembly, the discs 15 will be spaced the required distance to receive a larger size of film. For the purpose of allowing a relatively large range of adjustment for this purpose, either one or both of the end portions 12 of the spindle 11 may be of exceptional length to accommodate very long spaces, the illustrated embodiment showing only one end portion of an extended length, namely the right end portion 12 as viewed in Fig. 2. Further, it is evident that annular spacer 17 may be interposed between either shoulder 13 and its respective disc 15.

The present invention is so constituted that any number of films from one to a complete load may be supported in the spool without hindering the effective developing, fixing and/or washing operations, likewise, any number of films up to a full load, the grooves 19 will maintain in suitably spaced relation during the developing, fixing and/or washing operations, and in all cases the films are individually supported and may be individually inserted and/or removed.

Although in the broader aspects of the present invention, any suitable means may be employed for subjecting the films supported by the spool 10 to suitable developing, fixing and/or washing solution, in accordance with the further phase of the present invention, means particularly adapted for this purpose are provided. Referring to the drawing, this means comprises a cylindrical tank 30 having a closed end 31 and an open end which is adapted to be closed by a screw cap 32 suitably threaded thereon and a gasket or washer 33 preferably interposed between the inner face of cap 32 and the open edge of tank 30 in order to seal the joint between them against leakage. A wall 34 is provided in spaced relation with respect to the bottom 31 of the tank 30 and is connected thereto by means of a central post 35 and a plurality of spirally arranged vanes 36 connected to the wall 34 upon one side and bottom 31 upon the other side, in a manner to provide a gravity actuated type of water wheel. The wall 34 and the cap 32 are each centrally provided with an outwardly and axially projecting trunnion 37. These trunnions 37 are adapted to be rotatively and removably received in the semi-circular, axially extended bearing 38 formed upon the upper ends of the vertically extending spaced arms 39 of a V-shaped base 40. The bearings 38 may be expeditiously constructed by transversely channeling and flaring as at 27 the upper extremities on 39 as shown.

The trunnions 37, either one or both, may be further adapted to receive a crank arm (not shown) upon that portion which extends beyond the bearings 38. This will enable the use of the invention where no water power is present to turn the water wheel aforementioned. Although any suitable engagement may be provided between a trunnion 37 and a crank arm, a suitable method is shown whereby the trunnion is provided with a flattened portion 44 on its extremity for relatively non-rotative cooperation with the crank arm.

In this construction tank 30, the inner diameter of the spool 10, the outer diameter of the discs 15, are preferably so constructed relative to each other that the spool 10 is relatively closely and slidably disposed in the tank 30 and tangentially supported therein by the circumferential edges of the discs 15 resting against the inner surface of tank 30. In the illustrated embodiment of the present invention the general position of the films in the cylindrical tank 30 is one of a spaced nature relative to the inner face of the tank, and according to its preferable form, a spaced and concentric relation relative to each other and the axis of rotation of the spool 10 which is substantially the axis of rotation of tank 30 as supported by its trunnions 37 in bearings 38. It is evident that the spool 10 and films 20 supported therein rotate with the tank 30 when the tank 30 is propelled by water 41 flowing upon the vanes 36 of the water wheel integral with the closed end 31 of said tank 30.

The respective parts herein described can be made of metal, hard rubber, molded cellulous ether or other cellulosic materials not affected by chemicals employed in developing, fixing and/or washing photographic films, and the nuts 18, cap 32 and outer circumference of tank 30 may be knurled to facilitate the handling of these respective parts.

Briefly, the handling and operation of the device is effected as follows:

The tank 30 is lifted from said supports 39, the cap 32 is removed and the spool 10 withdrawn. If necessary one nut 18 on the end portion 12 of spindle 11 and the adjacent disc 15 are removed and a spacer 17 is placed upon the end portion 12 of a length sufficient to make the distance between the bottom of corresponding grooves 19 on the opposed faces of disc 15 substantially the same as the width of the films 20 which are to be inserted in said grooves. The disc 15 is replaced on the end portion 12 and is tightened and secured by nuts 18 in a position symmetrically opposed to the other disc 15. Next, the films 20 are inserted between flanges 22 into corresponding grooves 19 on their respective discs 15, guided by the widened openings or mouths of grooves 19 thereof which are provided by the bevelling of the lands 24. The tank 30 is up-ended and partially filled with the desired amount of developing liquids, and the spool 10 with films 20 supported concentrically therein, is placed in the tank 30 and cap 32 screwed securely in place. The relative positions of tank 30 and the spool 10 thereby become one of substantially corresponding axes. Thereafter the tank 30 is replaced upon base 40 with the trunnions 37 received in the bearings 38 as illustrated. The device is then placed under a faucet 43 in proper position for the water 41 therefrom to fall upon the concave surfaces of the vanes 36 of said water wheel to one side of the axis of the tank 30 which is thereby revolved on its trunnions 37 in the bearings 38. The spool 10, which is tangentially supported in said tank, is rotated with the tank 30 for the length of time desired for the action of the liquid to take place, and the liquid inside which, because of gravity, retains its lowest level in the tank. It is evident that only an amount of liquid need be used which will fill the tank, when axially horizontally disposed, to a depth slightly greater than the radial distance between the innermost film supported in the tank and the face of said tank, thus effecting a great saving of liquids. In retaining its lowest level the liquid bathes the films 20 supported in the tank 30 as they circularly rotate with and in the spool 10. Substitution of liquid in the tank enables the use of the several solutions necessary in the developing, fixing and/or washing of the films, all of which are referred to in the following claims as "developing" of films.

Although but one preferred embodiment of the present invention has been shown and described herein, it will be apparent that it is capable of various modifications and changes, and, accordingly, formal changes may be made therein without departing from the substance or the spirit of the broad invention, the scope of which is commensurate with the appended claims.

What is claimed is:

1. Means for supporting a plurality of separate photographic films or the like, in spaced relation, comprising, in combination, a pair of spaced parallel plate-like members, a post connecting said members and securing them in fixed relation with respect to each other, a plurality of ridges on the opposed faces of said members, said ridges being arranged in spaced relation about said posts, and portions of the edges of said members being cut away to expose the grooves formed between said ridges whereby to enable the direct insertion of a film in any one of the individual grooves.

2. A holder for supporting a plurality of separate photographic films or the like, comprising, in combination, two parallel plate-like members symmetrically opposed relative to each other, a plurality of lands arranged in spaced and concentric relation on the opposed faces of said members for receiving films between them, and a spindle means operatively engaging said members and adapted to retain said members in spaced relation to each other.

3. A holder for supporting a plurality of separate photographic films or the like, comprising, in combination, parallel and symmetrically opposed discs having corresponding concentric grooves upon their inner faces for supporting films in spaced and concentric relation, and means securing said discs in spaced relation relative to each other.

4. Means for supporting a plurality of separate photographic films or the like, comprising, in combination, a spindle, two symmetrically opposed parallel discs mounted on said spindle and correspondingly disposed perpendicularly to the axis thereof, replaceable means intermediate said spindle and one of said discs adapted to cooperate with said spindle in manner as to space said discs a fixed distance apart, and securing means operatively engaging said spindle in manner as to retain the discs in a fixed spaced relation relative to each other, said discs being adapted to support upon their inner faces photographic films in a spaced relation and concentrically disposed relative to the axis of said spindle.

5. Means for supporting a plurality of separate photographic films or the like, comprising, in combination, a spindle, two symmetrically opposed discs mounted on opposite ends of said spindle and maintained in spaced relation relative to each other thereby, said discs having corresponding marginal portions cut away and the remaining marginal portions having corresponding grooves upon the inner faces thereof for supporting in a spaced relation films concentrically disposed around the said spindle and between said discs.

6. Means for supporting a plurality of separate photographic films or the like, comprising, in combination, a spindle, symmetrically opposed discs disposed on and secured in perpendicular relation to the axis of said spindle at opposite ends thereof, said discs having corresponding marginal portions thereof removed and the remaining portions so constructed and arranged as to receive and support in a spaced relation, films disposed around the axis of said spindle.

7. Means for supporting a plurality of separate photographic films or the like, comprising, in combination, a spindle, symmetrically opposed discs disposed on and secured in perpendicular relation to the axis of said spindle adjacent the ends thereof, said discs having corresponding marginal portions thereof removed to form notches therein, and concentric ridges formed upon the inner faces of the remaining portions of said discs, and terminating adjacent the margins of said notches, and said ridges being narrowed at one end to provide a wide mouth to the grooves between said ridges.

8. Means for supporting a plurality of separate photographic films or the like, comprising, in combination, two parallel and symmetrically opposed plate-like members, means for retaining said members in a spaced relation, said members having corresponding marginal portions thereof removed, and concentric ridges formed on the inner faces of said members upon the remaining marginal portions thereof for supporting films in a concentric spaced relation between said members, said ridges at one end being of appreciably less length than the said remaining portion in manner as to provide flanges adjacent the ends of said ridges for directing films between said members when inserted into the grooves between said ridges.

9. In a film developing apparatus, a film holder comprising two opposed parallel platelike members, each member having concentric means thereon cooperating with corresponding means on the opposed member for supporting a plurality of separate photographic films in a curved spaced relation and adapted to give to the film a curved shape.

FREDERICK C. SCHNELZ.